(12) United States Patent
Matsumoto (10) Patent No.: US 9,383,061 B2
(45) Date of Patent: Jul. 5, 2016

(54) MACHINE TOOL AND DRIVE REGULATION DEVICE FOR SAID MACHINE TOOL

(75) Inventor: Hitoshi Matsumoto, Saitama (JP)

(73) Assignees: CITIZEN HOLDINGS CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 352 days.

(21) Appl. No.: 14/232,252

(22) PCT Filed: Jul. 10, 2012

(86) PCT No.: PCT/JP2012/067609
§ 371 (c)(1),
(2), (4) Date: Jan. 11, 2014

(87) PCT Pub. No.: WO2013/008823
PCT Pub. Date: Jan. 17, 2013

(65) Prior Publication Data
US 2014/0132086 A1    May 15, 2014

(30) Foreign Application Priority Data
Jul. 14, 2011   (JP) ................... 2011-155561

(51) Int. Cl.
*F16P 3/20* (2006.01)
*F16P 3/08* (2006.01)
(Continued)

(52) U.S. Cl.
CPC ............... *F16P 3/08* (2013.01); *B23Q 11/0085* (2013.01); *B23Q 11/0092* (2013.01); *B23Q 11/0891* (2013.01); *G05B 9/02* (2013.01); *B23B 3/00* (2013.01); *B23B 2270/60* (2013.01)

(58) Field of Classification Search
CPC ..... F16P 3/08; B23Q 11/0092; B23B 2270/60
See application file for complete search history.

(56) References Cited

U.S. PATENT DOCUMENTS

| | | | |
|---|---|---|---|
| 5,703,452 A | 12/1997 | Futsuhara | |
| 8,232,687 B2 * | 7/2012 | Stadler | ............ H01S 3/005 307/328 |

(Continued)

FOREIGN PATENT DOCUMENTS

| | | |
|---|---|---|
| DE | 10241806 A1 | 5/2004 |
| EP | 0760446 A1 | 3/1997 |

(Continued)

OTHER PUBLICATIONS

International Search Report for PCT/JP2012/067609, Oct. 23, 2012.
(Continued)

*Primary Examiner* — Daniel Cavallari (57) ABSTRACT

A drive regulation device for a machine tool that stops driving of a motor when a door (18) provided for a cover (17) for covering a driven body driven by the motor becomes to be in an open state includes a detection unit (21) detecting an open/closed state of the door (18) provided for the cover (17) for covering the driven body driven by the motor, an excitation operation unit (22) switching the motor between an excitation state and a non-excitation state, a speed regulation unit (23) stopping the motor, when the motor that has been stopped is rotated faster than a predetermined allowable rotation speed, and a speed-regulation switch unit (24) controlling the speed regulation unit (23), in a case where the detection unit (21) detects that the door (18) is in the open state, such that the speed regulation unit (23) works when the motor is in the excitation state, and the speed regulation unit (23) does not work when the motor is in the non-excitation state.

6 Claims, 4 Drawing Sheets

(51) Int. Cl.
 *B23Q 11/00* (2006.01)
 *B23Q 11/08* (2006.01)
 *G05B 9/02* (2006.01)
 *B23B 3/00* (2006.01)

(56) References Cited

U.S. PATENT DOCUMENTS

2002/0111702 A1* 8/2002 Angel .................. F16P 3/14
 700/79
2011/0259060 A1* 10/2011 Leska ................... F16P 3/10
 70/174
2013/0025372 A1* 1/2013 Ye ....................... G01M 1/045
 73/629
2013/0277169 A1* 10/2013 Nakayasu .......... B23Q 11/0891
 192/129 A

FOREIGN PATENT DOCUMENTS

| JP | S51-67577 A | | 6/1976 |
| JP | H06-297291 A | | 10/1994 |
| JP | H08-137526 A | | 5/1996 |
| JP | 2010052056 A | * | 3/2010 |
| JP | 2010-52056 A | | 3/2013 |

OTHER PUBLICATIONS

Extended European search report for EP Application No. 12810786.9, Feb. 16, 2015.
Taiwan Intellectual Property Office, Office Action for Taiwan Patent Application 101125074, May 7, 2016.
Haas Automation Co., Ltd., "Technical Reference", 96-0003 rev J, Jan. 2006.

* cited by examiner

MACHINE TOOL AND DRIVE REGULATION DEVICE FOR SAID MACHINE TOOL

TECHNICAL FIELD

The present invention relates to a machine tool and a drive regulation device for the machine tool.

BACKGROUND

Machine tools typically include a driven body that is rotationally driven or driven by traveling by a motor, such as a main spindle, a headstock, and a tool post. Normally, the driven body is stored in a cover provided with a door, and a workpiece grasped by the main spindle is machined therein. The door is provided to be freely opened and closed and thus, opening the door allows maintenance on the driven body inside the cover.

In such a machine tool, if the motor drives the driven body during maintenance, then maintenance is interrupted and, further, safety may not be able to be ensured. Thus, there are provided machine tools that each include a drive regulation device provided with a detection unit for detecting an open state and a closed state of the door and a motor regulation unit for regulating a rotation of the motor so as to stop the rotation of the motor when the door is in the open state.

As an example of the motor regulation unit, a speed regulation unit has been known that, when an unexpected rotation such as an erroneous operation occurs on the motor that has been stopped, if the rotation speed of the motor exceeds a predetermined allowable rotation speed, an error occurs at a control apparatus side to stop the motor (e.g., refer to Patent Literature 1). The allowable rotation speed is set to be an extremely low speed so that an operator can easily handle the case even if the unexpected rotation occurs on the motor. When the door is opened, the motor is stopped by the operation of the speed regulation unit and, additionally, even when the rotation of the motor erroneously occurs, an unexpected high-speed rotation of the motor can be prevented since only the extremely low speed is allowed for the allowable rotation speed.

Further, as the motor regulation unit, an excitation stop unit has been also known that cuts a power source to be supplied to the motor when the door is in the open state so as to make the motor non-excited to stop the motor, and also regulates the unexpected rotation of the motor (e.g., refer to Patent Literature 2)

PRIOR ART DOCUMENTS

Patent Literature

Patent Literature 1: Japanese Patent Application Laid-Open No. 8-137526 ([0013]-[0015], and FIG. 1)
Patent Literature 2: Japanese Patent Application Laid-Open No. 51-67577 (Page 1, Lines 4-12 in a right section)

SUMMARY OF THE INVENTION

Problems to be Solved by the Invention

In a case where the above-described speed regulation unit is adopted as a motor regulation unit, for example, when excitation of a main spindle motor is stopped and a main spindle is manually, freely rotated to perform maintenance, a rotation speed of the main spindle motor can exceed the above-described allowable rotation speed only by manually rotating the main spindle. In this case, there is a problem in which every time the rotation speed of the main spindle exceeds the allowable rotation speed, a speed regulation unit responds to frequently cause an error, thereby reducing maintenance efficiency.

Further, in a case where the above-described excitation stop unit is adopted as the motor regulation unit, if a door is opened when the main spindle motor is excited to index the main spindle at a predetermined angular position like a D-cut process or a polygon process for example, there is a problem in which the excitation of the main spindle motor is stopped to allow the main spindle to freely rotate, thereby causing the angular position of the main spindle to be erroneously moved over during maintenance.

Means for Solving the Problem

A drive regulation device for a machine tool that stops driving of a motor when a door provided for a cover for covering a driven body driven by the motor becomes to be in an open state includes a detection unit detecting an open state and a closed state of the door; an excitation operation unit switching the motor between an excitation state and a non-excitation state; a speed regulation unit stopping the motor, when the motor that has been stopped is rotated faster than a predetermined allowable rotation speed; and a speed-regulation switch unit controlling the speed regulation unit, in a case where the detection unit detects that the door is in the open state, such that the speed regulation unit works when the motor is in the excitation state, and the speed regulation unit does not work when the motor is in the non-excitation state.

The driven body may include a main spindle of the machine tool and, in this case, in a case where a control apparatus for controlling a main spindle motor for rotationally driving the main spindle is in a C-axis mode for indexing the main spindle at a predetermined rotation angular position to perform positioning and fixing, the excitation operation unit maintains the main spindle motor in the excitation state, when the detection unit detects that the door is in the open state.

In a case where the driven body includes the main spindle of the machine tool as described above, when the control apparatus is not in the C-axis mode and when the detection unit detects that the door is in the open state, the excitation operation unit switches the main spindle motor from the excitation state to the non-excitation state.

A machine tool includes a driven body, a motor driving the driven body, a door provided for a cover for covering the driven body, a detection unit detecting an open state and a closed state of the door, and a drive regulation device stopping driving of the motor, when the detection unit detects that the door is in an open state, wherein the drive regulation device includes an excitation operation unit switching the motor between an excitation state and a non-excitation state, a speed regulation unit stopping the motor, when the motor that has been stopped is rotated faster than a predetermined allowable rotation speed, and a speed-regulation switch unit controlling the speed regulation unit, in a case where the detection unit detects that the door is in the open state, such that the speed regulation unit works when the motor is in the excitation state, and the speed regulation unit does not work when the motor is in the non-excitation state.

The driven body may include a main spindle of the machine tool and, in this case, in a case where a control apparatus for controlling a main spindle motor for rotationally driving the main spindle is in a C-axis mode for indexing the main spindle at a predetermined rotation angular position to perform positioning and fixing, the excitation operation unit maintains the main spindle motor in the excitation state, when the detection unit detects that the door is in the open state.

In a case where the driven body includes the main spindle of the machine tool as described above, when the control apparatus is not in the C-axis mode and when the detection unit detects that the door is in the open state, the excitation operation unit switches the main spindle motor from the excitation state to the non-excitation state.

Advantage of the Invention

According to the drive regulation device of the machine tool, since the motor stops rotating when the door provided for the cover covering the driven body driven by the motor is set to be in the open state for the maintenance operation, the safety of the maintenance operation can be ensured. When the door is in the open state, and when the motor is in an excitation state by supplying the power source to the motor, the speed regulation unit works. Therefore, even if the unexpected rotation occurs on the motor, the motor is not allowed to rotate faster than the allowable rotation speed. Thus, for example, in such a case where the maintenance operation is performed with the motor excited to keep a rotation angle, the angular position of the motor is prevented from erroneously moving off when the maintenance is performed and, further, the high-speed rotation of the motor that is unexpected for the operator can be prevented, thereby ensuring maintenance safety.

When the door is in the open state and when the motor is in the non-excitation state by stopping the power supply to the motor, since the speed regulation unit does not work, the driven body such as the main spindle and the tool post can be manually rotated or moved so that content of the maintenance operation can be flexibly handled, thereby improving the operation efficiency.

For example, in a case where the driven body includes the main spindle of the machine tool, when the door becomes to be in the open state for the maintenance operation and when the control apparatus of the main spindle motor is in a C-axis mode, the excitation operation unit continuously excites the main spindle motor to maintain the rotation angle of the main spindle motor. Thus, the angular position of the main spindle motor can be prevented from erroneously moving off when the maintenance operation is performed, and the process performed by the machine tool can be smoothly resumed after the maintenance operation is finished. In this case, since the speed regulation unit works, even if the unexpected rotation occurs on the main spindle motor, the main spindle motor is not allowed to rotate faster than the allowable rotation speed. Thus, the high-speed rotation of the main spindle motor that is unexpected for the operator can be prevented, thereby ensuring the safety of the maintenance operation.

Further, in the case where the driven body includes the main spindle of the machine tool as described above, when the door is in the open state for the maintenance operation and when the control apparatus of the main spindle motor is in another mode than the C-axis mode, the excitation operation unit automatically cuts the excitation on the main spindle motor. Thus, the unexpected rotation of the main spindle can be prevented. In this case the speed regulation unit does not work, and the main spindle can be freely rotated accordingly, thereby being particularly advantageous for the maintenance operation requiring no indexing and no fixing of the main spindle.

DESCRIPTION OF THE PREFERRED EMBODIMENTS

Figure 1:
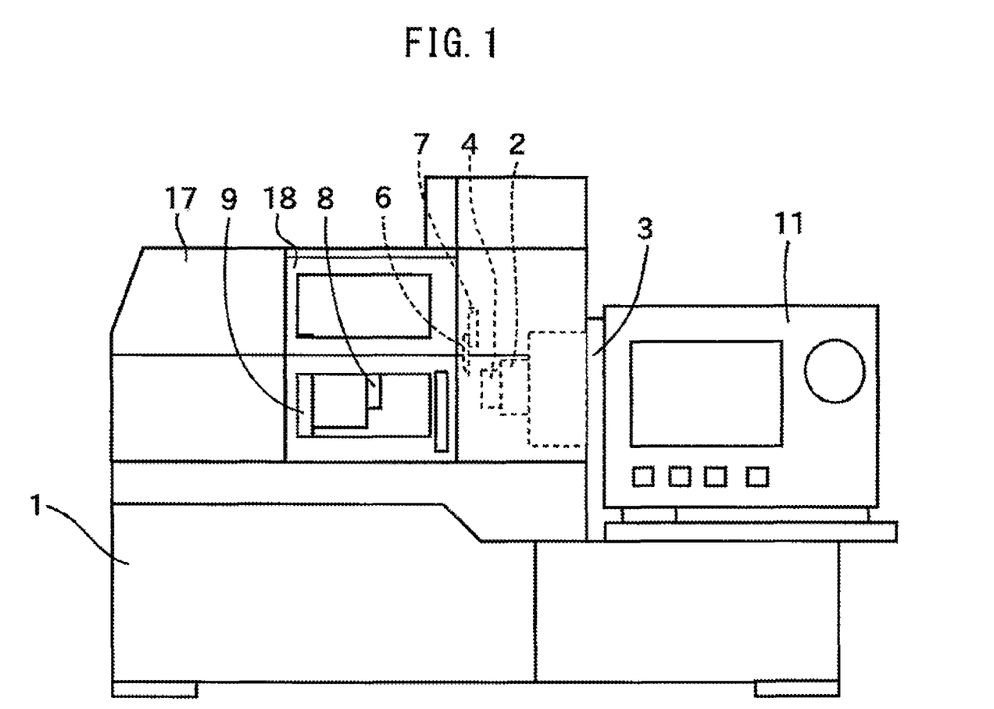
FIG. 1 is a front view illustrating an automatic lathe with a door closed.

An automatic lathe illustrated in FIG. 1 is an example of a machine tool, and includes, on a bed 1, a headstock 3 for supporting a main spindle 2 to freely rotate, and a machining tool 6 for machining a workpiece 4 grasped at an end of the main spindle 2. The machining tool 6 is mounted on a tool post 7 supported on the bed 1.

The headstock 3 is supported to be freely moved in an axis line direction of the main spindle 2 (hereinafter, referred to as a "Z axis direction"). The tool post 7 is supported to be freely moved in an X axis direction which is orthogonal to the Z axis direction in a horizontal direction, and in a Y axis direction which is orthogonal to the Z axis direction in a vertical direction. On the bed 1, a back spindle 8 is disposed opposite to the main spindle 2. The back spindle 8 is supported to be freely, rotationally driven on a back headstock 9. The back headstock 9 is supported to be freely moved in the Z axis direction and the X axis direction.

The headstock 3, the back headstock 9, and the tool post 7 are coupled to any of feed motors corresponding to travel direction thereof, and are driven by travelling by the feed motors. The main spindle 2 and the back spindle 8 are rotationally driven by main spindle motors provided for respective spindles. On the bed 1, a control apparatus 11 is mounted that controls the rotation of each feed motor and each main spindle motor.

Figure 2:
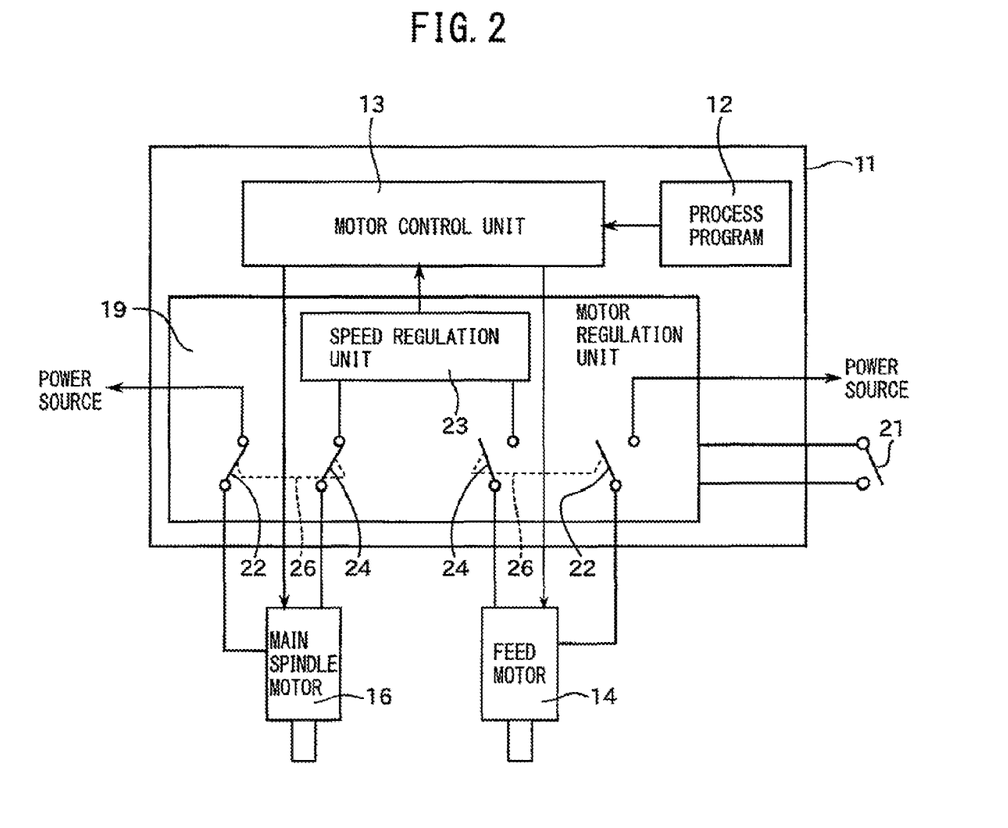
FIG. 2 is a block diagram of a main part illustrating a control apparatus.

The control apparatus 11 previously stores a machining program 12 as illustrated in FIG. 2. The control apparatus 11 controls the feed motors 14 and the main spindle motors 16 via a motor control unit 13 based on the machining program 12 so as to control the rotation of the main spindle 2 and the back spindle 8 and the travel of the headstock 3, the tool post 7, and the back headstock 9. Note that FIG. 2 illustrates one feed motor 14 and one main spindle motor 16 as representatives.

The automatic lathe machines the workpiece grasped by the main spindle 2 and the back spindle 8 under rotation control of the main spindle 2 and the back spindle 8 and travel control of the headstock 3, the back headstock 9, and the tool post 7 performed by the control apparatus 11. Examples of the machining of the workpiece includes a D cut process and a key groove process in which a predetermined machining is performed at a predetermined angular position of the workpiece, and a polygon process in which the rotation of the main spindle 2 and the back spindle 8 is controlled (C-axis control) to perform the machining.

When the predetermined machining is performed at the predetermined angular position of the workpiece, or when the machining is performed under the C-axis control, the control apparatus 11 performs the C-axis mode for indexing the main spindle 2 and the back spindle 8 at the predetermined rotation angular positions to perform positioning and fixing. When the C-axis mode is set, the control apparatus 11 performs the positioning of the rotation axis of the main spindle motor 16 at the predetermined rotation angle, and excites the main spindle motor 16 to stop the main spindle motor with the rotation angle maintained so that the rotation angular positions of the main spindle 2 and the back spindle 8 can be fixed.

The control apparatus 11 performs and cancels the C-axis mode according to an instruction of a step (block) of the executed machining program 12. For example, when the instruction for indexing the main spindle 2 at the predetermined angular position is given to perform the D cut process, or when the polygon process is performed, the C-axis mode is performed. The C-axis mode is canceled according to a simple rotation instruction or a simple stop instruction of the main spindle 2. Therefore, when an instruction for cutting a normal outer shape is given, the C-axis mode is not performed.

As for the headstock 3, the back headstock 9, and the tool post 7, the control apparatus 11 rotates the each feed motor 14 corresponding thereto to move the headstock 3, the back headstock 9, and the tool post 7 to each of the predetermined positions so as to excite the each feed motor 14 and perform positioning and fixing.

The end of the main spindle 2, the back spindle 8, the back headstock 9, and the tool post 7 are stored in a cover 17 provided on the bed 1. Therefore, the machining at a main spindle 2 side and at a back spindle 8 side are performed inside the cover 17. Cutting oil and cut scrap is prevented from scattering by the cover 17 during the machining. The cover 17 is provided with a door 18 that is freely opened and closed.

Figure 3:
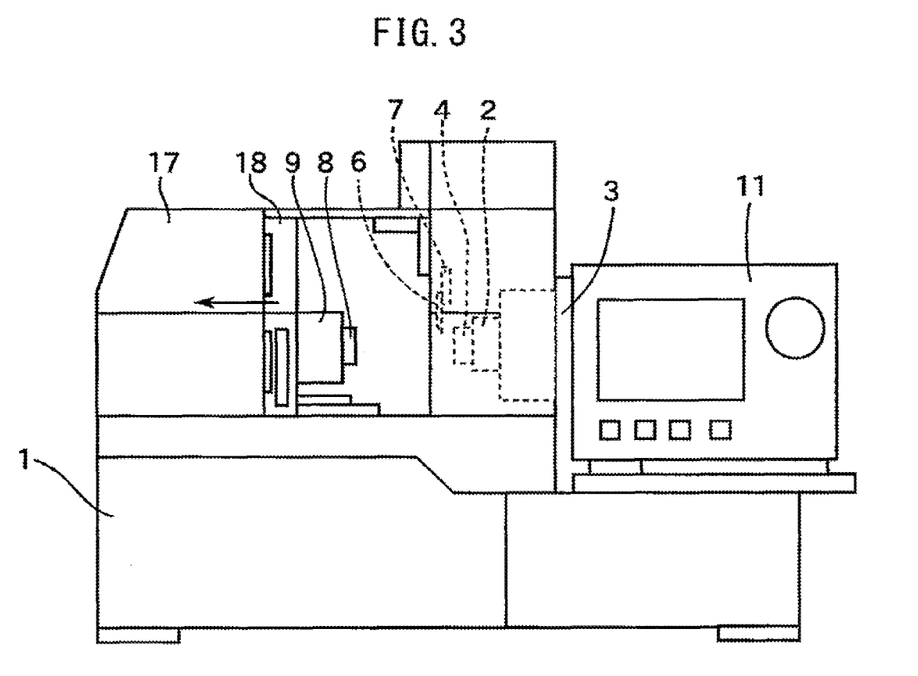
FIG. 3 is a front view illustrating the automatic lathe with the door opened.

As illustrated in FIG. 3, when the door 18 is opened, the operator can easily perform the maintenance operation inside the cover 17. In other words, the door 18 is served as a guard that can be freely opened and closed for a structure inside the cover 17. An "open state" of the door 18 refers to a state where the door 18 is actually opened and, additionally, for example, a state, such as a cancelled state of a lock, where the door 18 is allowed to be opened regardless of the open/closed state of the door 18, when an opening/closing regulation unit such as the lock for regulating the opening and closing of the door is provided, for example.

The control apparatus 11 includes a motor regulation unit 19 as the drive regulation device for regulating the rotation of each feed motor 14 and each main spindle motor 16 depending on the open/closed state of the door 18. When the door 18 is in the open state, the motor regulation unit 19 works, and therefore the rotation of the main spindle 2 and the back spindle 8 and the travel of the headstock 3, the back headstock 9, and the tool post 7 are stopped in a state where the door 18 is in the open state. Accordingly, the operator can safely and easily perform the maintenance operation.

As illustrated in FIG. 2, the motor regulation unit 19 includes a detection switch 21 that is a detection unit for detecting the open/closed state of the door 18, a power-source operation switch 22 for switching the power source between power supply and stop of the supply to each feed motor 14 and each main spindle motor 16, a speed regulation unit 23 for regulating the rotation speed of the each feed motor 14 and the each main spindle motor 16, and a speed-regulation switch unit 24 for switching operations of the speed regulation unit 23 for the each feed motor 14 and the each main spindle motor 16 depending on excitation states of the each feed motor 14 and the each main spindle motor 16, respectively.

The detection switch 21 outputs an OFF signal when the door 18 is in the open state, and outputs an ON signal when the door 18 is in the closed state.

The power-source operation switch 22 includes an excitation operation unit for switching the excitation state where the power is supplied to the motor and the non-excitation state where the power supply to the motor is stopped. The power-source operation switch 22 is provided for the each feed motor 14 and the each main spindle motor 16. Setting the power-source operation switch 22 to be ON state causes the motor, to which the power is supplied, to be the excitation state, and setting the power-source operation switch 22 to be OFF state causes the motor, to which the power supply is stopped, to be the non-excitation state.

If an arbitrary stopped motor starts to rotate, the speed regulation unit 23 stops the rotating motor when the speed of the rotation of the motor exceeds the predetermined allowable rotation speed. The allowable rotation speed is set to the extremely low speed so that the operator can easily handle the case even if the motor that has been stopped starts to rotate, which is unexpected for the operator, and the driven body such as the main spindle 2, the back spindle 8, the headstock 3, the back headstock 9, and the tool post 7, which is driven by the each feed motor 14 and the each main spindle motor 16, is driven by traveling or rotationally driven.

The speed-regulation switch unit 24 works in association with the power-source operation switch 22 by an association unit 26. The speed-regulation switch unit 24 and the association unit 26 are provided for the each feed motor 14 and the each main spindle motor 16.

Figure 4:
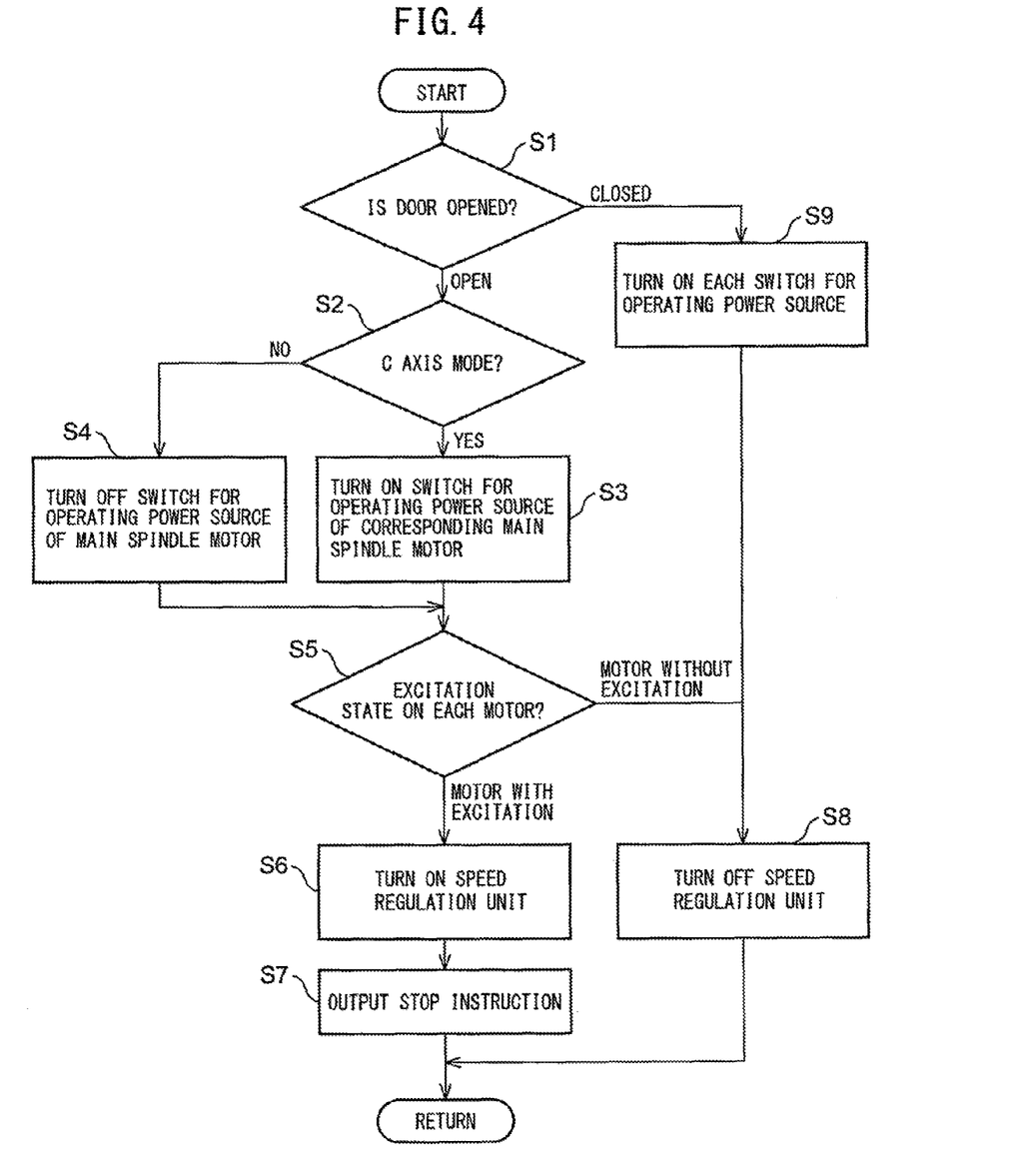
FIG. 4 is a flowchart illustrating operations of a motor regulation unit.

In step S1, as illustrated in a flowchart in FIG. 4, the motor regulation unit 19 checks whether the door 18 is opened or closed based on the ON signal or the OFF signal output from the detection switch 21. When the door 18 is opened, the processing proceeds to step S2.

Subsequently, in step S2, the motor regulation unit 19 checks whether the control apparatus 11 is in the C-axis mode according to the content regulated in the block of the machining program 12 performed by the control apparatus 11. When it is determined that the control apparatus 11 is in the C-axis mode in step S2, the processing proceeds to step S3. On the other hand, when it is determined that the control apparatus 11 is not in the C-axis mode in step S2, the processing proceeds to step S4.

In step S3, the power-source operation switch 22 of the corresponding main spindle motor 16 is turned on. According to the operation, the power is supplied to the main spindle motor 16 corresponding to the C-axis mode to excite the main spindle motor 16.

In step S4, the power-source operation switch 22 of the main spindle motor 16 is turned off. According to the operation, the power supply to the main spindle motor 16 is stopped, which is in the non-excitation state accordingly.

The processing proceeds to step S5 from step S3 or step S4. In step S5, the motor regulation unit 19 checks whether each of the feed motors 14 and the main spindle motors 16 is in the excitation state or the non-excitation state based on the ON/OFF state of the power-source operation switch 22. The processing proceeds to step S6, with respect to each motor which is determined to be in the excitation state in step S5. The processing proceeds to step S8, with respect to each motor which is determined to be in the non-excitation state in step S5.

In step S6, for the motor or motors determined to be in the excitation state in step S5, the motor regulation unit 19 switches corresponding speed-regulation switch unit 24 to a speed regulation unit 23 side to cause the speed regulation unit 23 to work. Subsequently, the processing proceeds to step S7.

In step S7, the speed regulation unit 23 outputs a stop instruction for stopping the motor to the motor control unit 13. Subsequently, the processing returns. When the control apparatus 11 is in the C-axis mode, since at least either the main spindle motors 16 of the main spindle 2 or the back spindle 8 is excited, the speed regulation unit 23 works on at least either the main spindle 2 or the back spindle 8. Thus, the rotation of at least one of the main spindle motors 16 is stopped with the excitation of the motor continued, and at least either the main spindle 2 or the back spindle 8 stops with the predetermined rotation angle maintained.

In step S8, for the motor or motors determined to be in the non-excitation state in step S5, the motor regulation unit 19 switches the speed-regulation switch unit 24 to a separation side from the speed regulation unit 23 not to cause the speed regulation unit 23 to work. Subsequently, the processing returns.

As described above, when the detection switch 21 detects the open state of the door 18, the motors 14 and 16 are stopped.

Each process in steps S5-S8 described above can be realized when the association unit 26 functions. The association unit 26 associates the power-source operation switch 22 with the speed-regulation switch unit 24 so that the speed regulation unit 23 works on the motor in the excitation state and the speed regulation unit 23 does not work on the motor in the non-excitation state, when the door 18 is in the open state.

With respect to each feed motor 14 and each main spindle motor 16, the speed-regulation switch unit 24 switches the operation of the speed regulation unit 23 on the motor by means of the association unit 26 so that the speed regulation unit 23 is caused to work when the motor is in the excitation state, and the speed regulation unit 23 is not caused to work when the motor is in the non-excitation state.

In step S1, when the door 18 is in the closed state, the processing proceeds to step S9. In step S9, the power is supplied to each motor, and then the processing proceeds to step S8. As described above, when each processing of steps S1, S9 and S8 is sequentially processed, the each feed motor 14 and the each main spindle motor 16 are controlled based on the machining program 12 by the motor control unit 13 without operation of the speed regulation unit 23.

If the operator opens the door 18 when carrying out maintenance with the motor regulation unit 19 described above, when the control apparatus 11 performs the process in the C-axis mode or when the operator operates to turn on the power-source operation switch 22 to continue to power supply of the predetermined motor, the excited motor is stopped with the predetermined rotation angle maintained by the excitation in a state where the speed regulation unit 23 works. With this arrangement, for example, the indexing state of the main spindle 2 and the back spindle 8, and the positioning and fixing state of the tool post 7, the headstock 3, and the back headstock 9 in a predetermined travel direction are maintained. Thus, the angular positions of the main spindle 2 and the back spindle 8, and the travel positions of the tool post 7, the headstock 3, and the back headstock 9 can be prevented from being erroneously moved off during the maintenance operation. In particular, during the process in the C-axis mode, since the indexing of the main spindle 2 and the back spindle 8 is continued in the open state of the door 18, the operator can easily perform the maintenance of the main spindle 2 and the back spindle 8 without consciousness of preventing the position from being moved off, unlike the conventional art.

Further, the speed regulation unit 23 is adapted to transmit, if the rotation speed of the motor exceeds the allowable rotation speed, an alarm to the motor control unit 13 side to stop the rotation of the motor rotating faster than the allowable rotation speed. Therefore, even if the unexpected rotation occurs on the motor that is being excited, due to the erroneous operation when the door 18 is in the open state, the motor is only allowed to rotate at the speed up to the allowable rotation speed by the operation of the speed regulation unit 23, and the motor is stopped when it is rotated faster than the allowable rotation speed. Thus, the high-speed rotation of the main spindle 2 and the back spindle 8, and a high-speed travel of the tool post 7, the headstock 3, and the back headstock 9 which are unexpected for the operator are not generated, thereby ensuring the safety of the operation. When the door 18 is in the closed state, since the motor is rotated faster than a regulation speed of the speed regulation unit 23, the motor can be stopped by causing the speed regulation unit 23 to work. With this arrangement, unlike the conventional art, without issuing a stop direction, the motor can be stopped when the door 18 is in the closed state.

Further, with the operation of the speed regulation unit 23 as described above, within a range where the speed of the motor does not exceeds the allowable rotation speed, the operator can intentionally, rotationally drive the main spindle 2 and the back spindle 8 at the low speed and move the tool post 7, the headstock 3, and the back headstock 9 at the low speed. In this case, since the driven body does not cause the high-speed rotation and the high-speed travel, which are unexpected for the operator, the operator can safely, easily perform the maintenance operation.

On the other hand, when the door 18 is in the open state and when the control apparatus 11 does not perform the process in the C-axis mode, or when the operator cuts the power supply to the motors via the power-source operation switch 22, the excitation of the motors is cut to stop the rotation of the each feed motor 14 and the each main spindle motor 16. Therefore, even if a rotation instruction is erroneously output from the motor control unit 13 to the motor to which the excitation is cut, since the power source is not originally supplied to the motor and thus the motor is in the non-excitation state, the rotational driving does not occur, thereby ensuring the safety of the maintenance operation. In this case, since the operation of the speed regulation unit 23 is stopped by the processing of the step S8, for example, even when the main spindle 2 and the back spindle 8 are manually rotated or when the tool post 7, the headstock 3, and the back headstock 9 are manually moved, the alarm is not generated by the speed regulation unit 23. Thus the operator can freely rotate the main spindle 2 and the back spindle 8 and freely move the tool post 7, the headstock 3, and the back headstock 9 to easily carry out maintenance, thereby improving maintenance efficiency.

What is claimed is:
1. A drive regulation device for a machine tool that stops driving of a motor when a door provided for a cover for covering a driven body driven by the motor becomes to be in an open state, the drive regulation device for the machine tool comprising:
   a detection unit detecting an open state and a closed state of the door;
   an excitation operation unit switching the motor between an excitation state and a non-excitation state;
   a speed regulation unit stopping the motor, when the motor that has been stopped is rotated faster than a predetermined allowable rotation speed; and
   a speed-regulation switch unit controlling the speed regulation unit, in a case where the detection unit detects that the door is in the open state, such that the speed regulation unit works when the motor is in the excitation state, and the speed regulation unit does not work when the motor is in the non-excitation state.

2. The drive regulation device of the tool machine according to claim 1, wherein
the driven body comprises a main spindle of the machine tool, and
in a case where a control apparatus for controlling a main spindle motor for rotationally driving the main spindle is in a C-axis mode for indexing the main spindle at a predetermined rotation angular position to perform positioning and fixing, the excitation operation unit maintains the main spindle motor in the excitation state, when the detection unit detects that the door is in the open state.

3. The drive regulation device of the tool machine according to claim 2, wherein, when the control apparatus is not in the C-axis mode and when the detection unit detects that the door is in the open state, the excitation operation unit switches the main spindle motor from the excitation state to the non-excitation state.

4. A machine tool comprising:
a driven body;
a motor driving the driven body;
a door provided for a cover for covering the driven body;
a detection unit detecting an open state and a closed state of the door; and
a drive regulation device stopping driving of the motor, when the detection unit detects that the door is in an open state,
wherein the drive regulation device comprises:
an excitation operation unit switching the motor between an excitation state and a non-excitation state;
a speed regulation unit stopping the motor, when the motor that has been stopped is rotated faster than a predetermined allowable rotation speed; and
a speed-regulation switch unit controlling the speed regulation unit, in a case where the detection unit detects that the door is in the open state, such that the speed regulation unit works when the motor is in the excitation state, and the speed regulation unit does not work when the motor is in the non-excitation state.

5. The tool machine according to claim 4, wherein
the driven body comprises a main spindle of the machine tool, and
in a case where a control apparatus for controlling a main spindle motor for rotationally driving the main spindle is in a C-axis mode for indexing the main spindle at a predetermined rotation angular position to perform positioning and fixing, the excitation operation unit maintains the main spindle motor in the excitation state, when the detection unit detects that the door is in the open state.

6. The tool machine according to claim 5, wherein, when the control apparatus is not in the C-axis mode and when the detection unit detects that the door is in the open state, the excitation operation unit switches the main spindle motor from the excitation state to the non-excitation state.

* * * * *